(12) United States Patent
Le Van Meautte

(10) Patent No.: US 6,601,955 B1
(45) Date of Patent: Aug. 5, 2003

(54) NOSE PAD ASSEMBLY

(75) Inventor: Valérie Le Van Meautte, Nogent sur Marne (FR)

(73) Assignee: WIS Sarl, Paris (FR)

( * ) Notice: Subject to any disclaimer, the term of this patent is extended or adjusted under 35 U.S.C. 154(b) by 296 days.

(21) Appl. No.: 09/907,172

(22) Filed: Jul. 17, 2001

(51) Int. Cl.$^7$ ................................................ G02C 5/12
(52) U.S. Cl. ........................ 351/136; 351/137; 351/130
(58) Field of Search ................................ 351/136, 137, 351/138, 130, 132, 71, 72, 76, 78–80

(56) References Cited

U.S. PATENT DOCUMENTS

| | | | |
|---|---|---|---|
| 1,789,937 A | | 1/1931 | Curran ........................ 351/63 |
| 2,298,832 A | | 10/1942 | Mowrer ....................... 351/131 |
| 3,233,956 A | * | 2/1966 | Angelis ....................... 351/136 |
| 3,345,121 A | * | 10/1967 | Angelis ....................... 351/130 |
| 3,476,468 A | * | 11/1969 | Fortenberry ................. 351/130 |
| 4,252,422 A | | 2/1981 | Speckhart .................... 351/137 |
| 4,787,729 A | | 11/1988 | Ruffen ......................... 351/137 |
| RE36,048 E | | 1/1999 | Schmolz et al. ............. 351/132 |
| 5,907,385 A | | 5/1999 | Flores et al. ................. 351/139 |

\* cited by examiner

*Primary Examiner*—Huy Mai

(57) ABSTRACT

An eyeglass frame has a bridge portion and nose pad assembly. The nose pad assembly included a support member in the shape of an elongate bar fixed to a rear surface of the bridge portion. The bar has arms extending from either end thereof, away from the bar in a rearward direction, the bar and arms being of relatively rigid construction, while the arms are able to flex rotationally about a junction point with the bar in response to pressure applied to the arms, while providing a biasing force against said pressure. The nose pad is made of flexible material, and is attached at either lateral edge thereof to a free end of a respective arm of the support member.

8 Claims, 4 Drawing Sheets

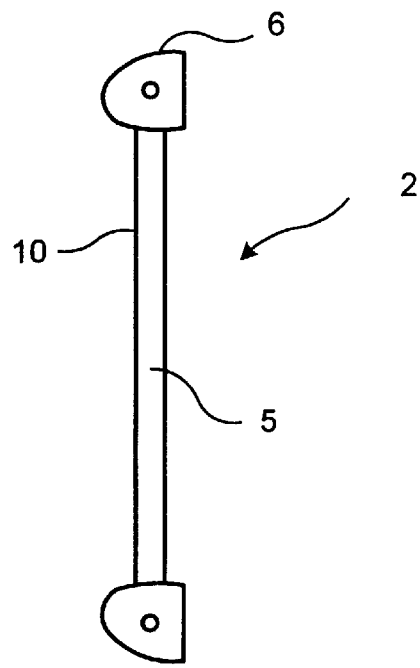
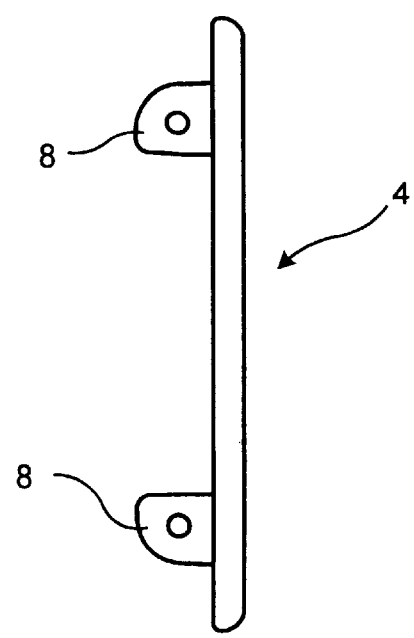
FIG. 4    FIG. 5
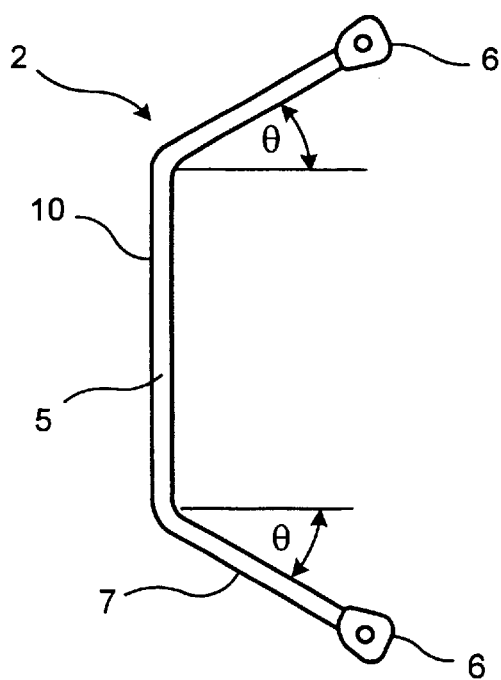
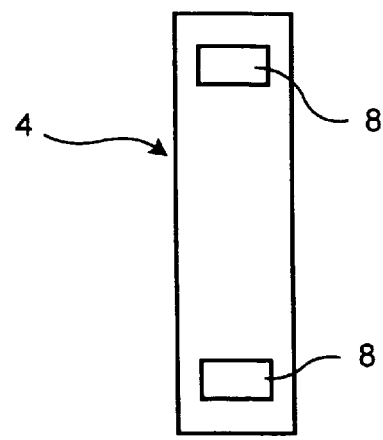
FIG. 6    FIG. 7

NOSE PAD ASSEMBLY

BACKGROUND OF THE INVENTION

The invention relates to an improved nose pad for eyeglasses, wherein the nose pad is generally flexible to accommodate or conform to any nose type of a human being and is situated on the bridge of the nose.

Eyeglasses are retained on a human being's head by two elements: the temples and the bridge. While the temple extends beyond and sometimes wraps itself around the ear of a wearer, the bridge of the eyeglasses is situated on the wearer's nose. Thus, a majority of the complaints relate to the fit and comfort of these elements on the head. Advances made in these areas hope to accommodate the various shapes and contours of the head. Most of these attempts are done in order to provide better fit and comfort to the wearer.

Much of the focus has centered on the bridge of the eyeglasses. A common complaint for wearers is that the eyeglasses tend to fall downward on the nose, and consequently fall off the wearer's head. Thus, a common attempt to remedy this problem was to add a nose pad that would attach to the eyeglasses. There have been variations on the nose pad and its point of attachment on the eyeglasses and on the nose. U.S. Pat. No. 5,907,385 discloses a pair of nose pads for eyeglasses that are situated on the bridge. However, when placed upon the wearer, the nose pads are on either side of the nose. Similarly, the nose pads in U.S. Pat. No. 2,298,832 are also situated on either side of the nose, rather than the bridge of the nose.

U.S. Pat. No. Re. 36,048 teaches a nose pad that is supported by one piece situated between the pad and the bridge of the eyeglasses. In addition, the nose pad is constructed of a rigid metal, making it very inflexible. Moreover, in order to adapt to the shape of the nose, the nose pad must rotate about a single axis.

The nose pad in U.S. Pat. No. 1,789,937 discloses one of uniform construction. The actual nose pad is part of an elongated piece of metal that is wrapped around the bridge of the eyeglasses. Thus, movement on the nose pad is restricted by its attachment to the bridge. Movement about the nose pad will change the position of the eyeglasses as they are attached to the nose pad.

A nose pad attached to the bridge by a suspension frame is taught in U.S. Pat. No. 4,252,422. While it is situated on the bridge of the nose, the nose pad is rather rigid and inflexible. Thus, it cannot conform to the shape of any particular nose. Rather, this nose pad is more of a padded support, so that the nose is not situated directly on the bridge of the eyeglasses itself.

U.S. Pat. No. 4,787,729 discloses a nose pad that is attached to a perpendicular member that allows the nose pad to move upwards and downwards. However, since the member is rigid, any movement in the nose pad will consequently affect the placement of the eyeglasses on the wearer. The nose pad is a rigid piece of metal that is unable to conform to the shape of a particular nose, and thus suffers the same detriments as outlined above.

The instant invention solves the deficiencies stated in the prior art, while providing improvements as stated herein.

SUMMARY

The general purpose of the present invention is to provide an improved nose pad assembly for eyeglasses which includes a bridge portion. A nose pad support member comprises a bar portion fixed to the rear face of the bridge. The support member further comprises, at either end of the bar portion, two arms extending rearwardly away from the bridge, for acting as a first fastening means in conjunction with the nose pad. The bar portion and the two arms are preferably of unitary construction to allow for sufficient strength and rigidity, as well as the ability of the arms to flex slightly relative to the bar in response to pressure from the nose pad. Unitary construction also provides for ease of assembly. However, it is also possible the bar portion is formed by the bridge portion itself, with the extending arms of the support being connected directly to the rear face of the bridge. The support member is preferably made of metal, for example in the form of a thin wire, to provide the properties of strength and flexibility.

The nose pad is preferably constructed of a plastic material such as PVC, and is generally flexible, such that when in use upon the bridge of the nose, the nose pad can flex and partially conform to the shape of the bridge of the nose. The nose pad is generally of an elongate form for lying laterally across the bridge of the nose. The nose pad is connected at either lateral end thereof to, and supported by, the respective free ends of the arms of the support member. Otherwise, the nose pad is unsupported in the central section thereof, which allows the ability for the nose pad to flex forward when placed on the nose.

It is a general objective of the invention to provide an improved nose pad that maximizes the comfort and fit of eyeglasses as worn upon the user's head, by creating a nose pad that is substantially flexible to adapt to the shape of the nose.

It is a further objective of the invention to provide a nose pad that can be comfortably situated on the bridge of the nose, rather than on its sides, thereby providing the eyeglasses with better support.

These and other objects of the invention are best understood and more apparent when the detailed description and the accompanying drawings are read in conjunction with each other.

DESCRIPTION OF THE DRAWINGS

FIG. 4 is a side view of a first fastening means.

FIG. 5 is a side view of a second fastening means.

FIG. 6 is a top view of a nose pad support member.

FIG. 7 is a top view of a nose pad showing the relative positions of the second fastening means.

DETAILED DESCRIPTION OF THE INVENTION

Figure 1:
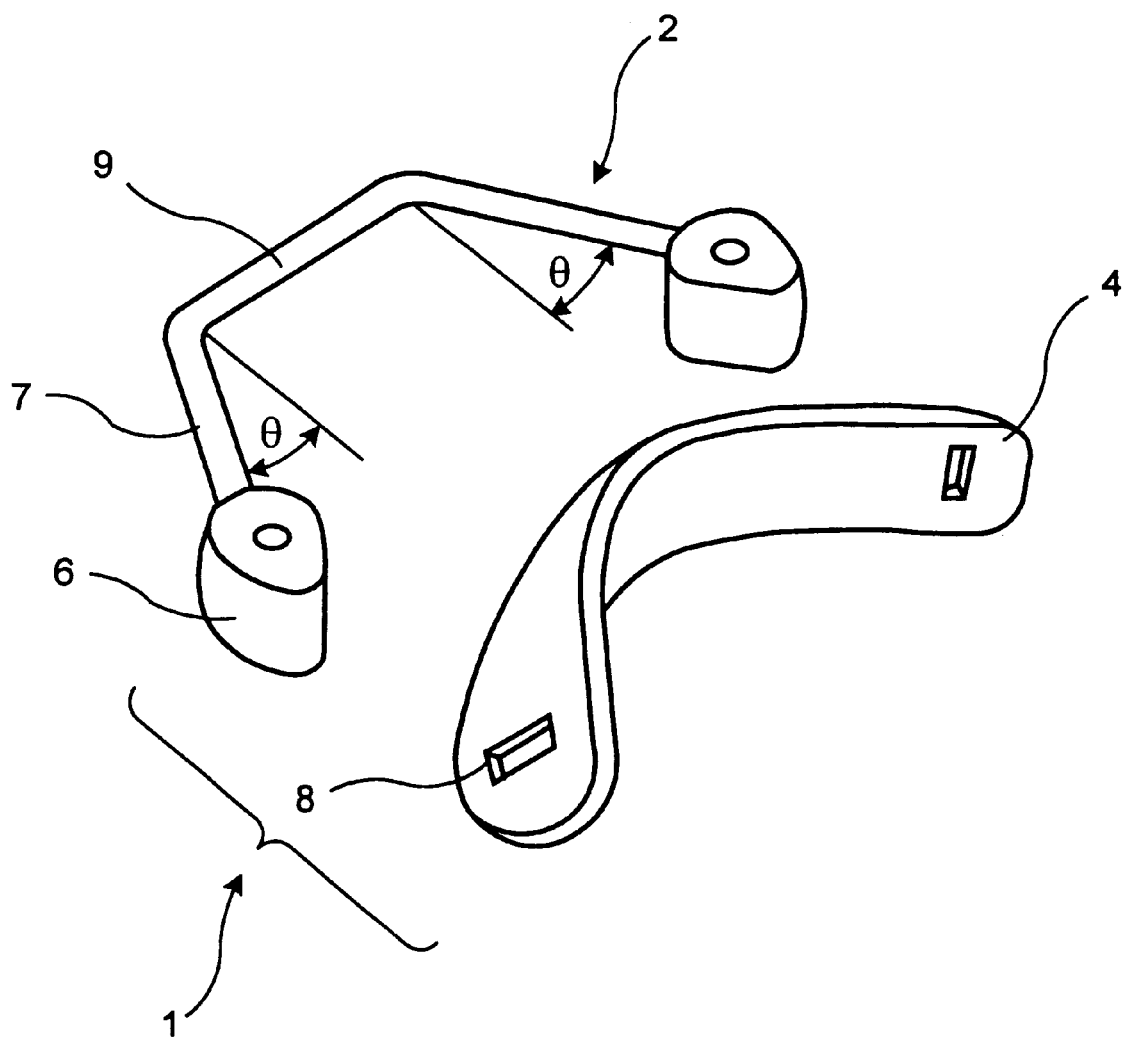
FIG. 1 is a front perspective view of the invention.

As shown in FIG. 1, a nose pad assembly (1) generally comprises a nose pad support member (2) and a nose pad (4). The nose pad support member (2) is preferably made of a metallic material in the for of a thin wire or the like, and is sufficiently flexible, so as to adapt to the stresses of the nose pad (4) and the eyeglasses (not shown). The nose pad (4) is preferably made of a flexible, but generally plastic such as PVC, or the like.

The nose pad support member (2) further comprises a support bar (9) and a pair of arms (7) generally extending from either lateral end of the support bar (9), as seen in FIGS. 1, 4, and 6. The support bar (9) and the arms (7) are of preferably unitary construction to provide the necessary strength which allows the arms to flex slightly with respect to the bar. The nose pad support member (2) is attached to the nose pad (4) by a fastening means such as welding, glue, or the like. In addition, the ends of the arms may have an enlarged fastening surface (6) providing additional surface area for connection to and support of the nose pad. The connection may also be made by way of a conforming shouldered tab and slot arrangement, involving the fastening surface and the nose pad. The enlarged surface (6) of the end of the arms may be called the first fastening means, and the second fastening means (8) located preferably on a forward face of the nose pad may be any corresponding means described above.

Figure 2:
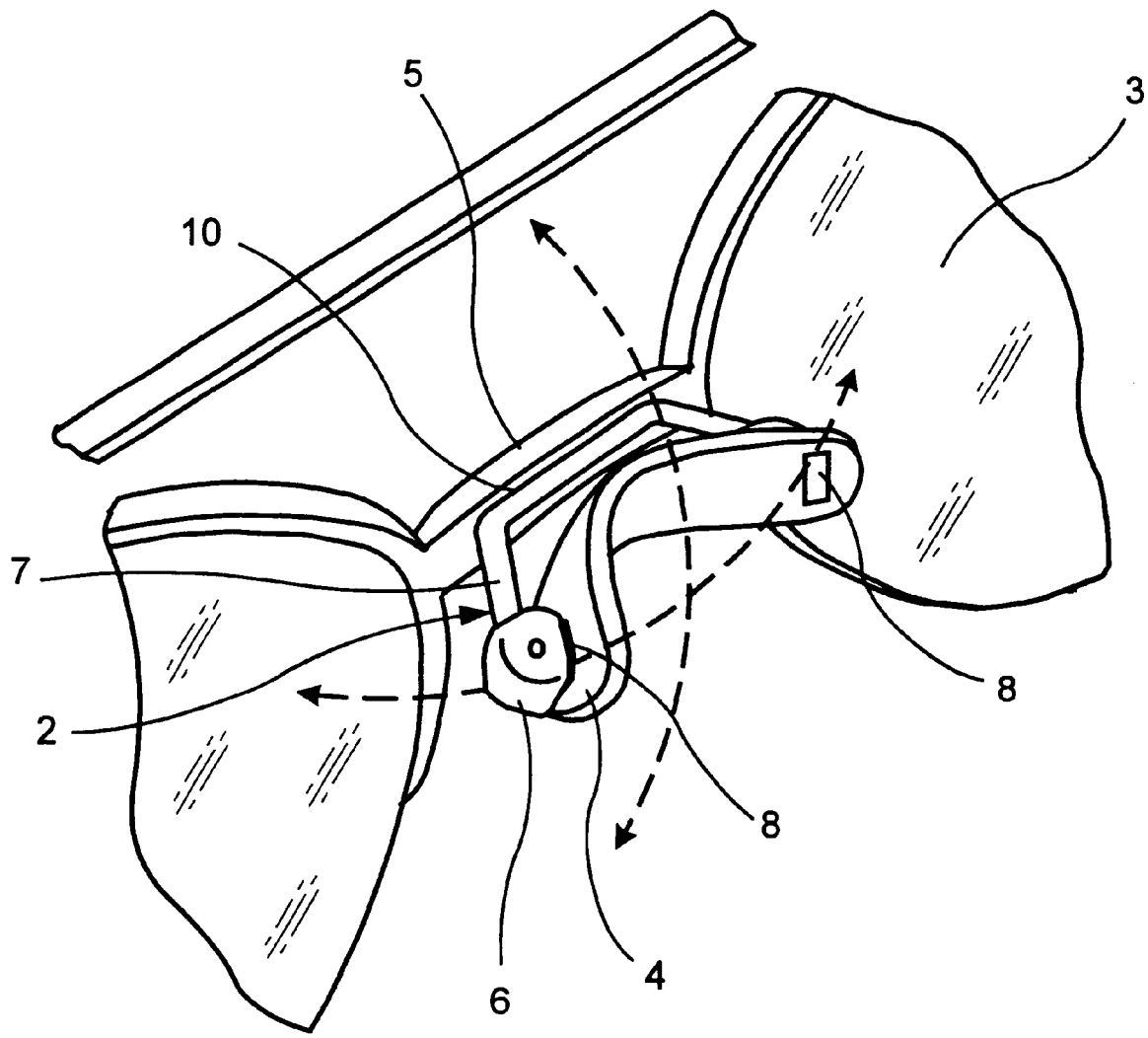
FIG. 2 is a front perspective of a preferred embodiment of the invention as attached to the eyeglasses.

When the nose pad support member (2) and the nose pad (4) are assembled to form the nose pad assembly (1), the nose pad (4) and a pair of arms (7) of the nose pad support member (2) are sufficiently flexible to adapt to the shape of the nose as shown in FIG. 2. The support member, and in particular the arms, are formed to provide a biasing, or spring-like, force when pressure is applied by the user's nose against the nose pad. This spring action, combined with the rigidity of the support member, allows the nose pad, and hence the eyeglasses, to conform and rest comfortably on the user's nose.

The nose pad lays generally parallel with the bridge of the eyeglasses and the support bar (9), extending across the bridge of the nose when in use, and fixed to and supported at either end by the arms of the support member.

The nose pad and arms work in conjunction with each other. When forward pressure is placed on the nose pad, the arms exhibit a slight rotation, laterally about the connection point with the bar, to counteract the forward pressure that is applied. Yet, the nose pad and the nose pad support member acting together are rigid enough to provide sufficient support in response to stress in a direction opposite to the bending force. In general, the sections of the support member, namely the bar and two arms, are all relatively rigid, but allow for flexibility at the junctions.

Figure 3:
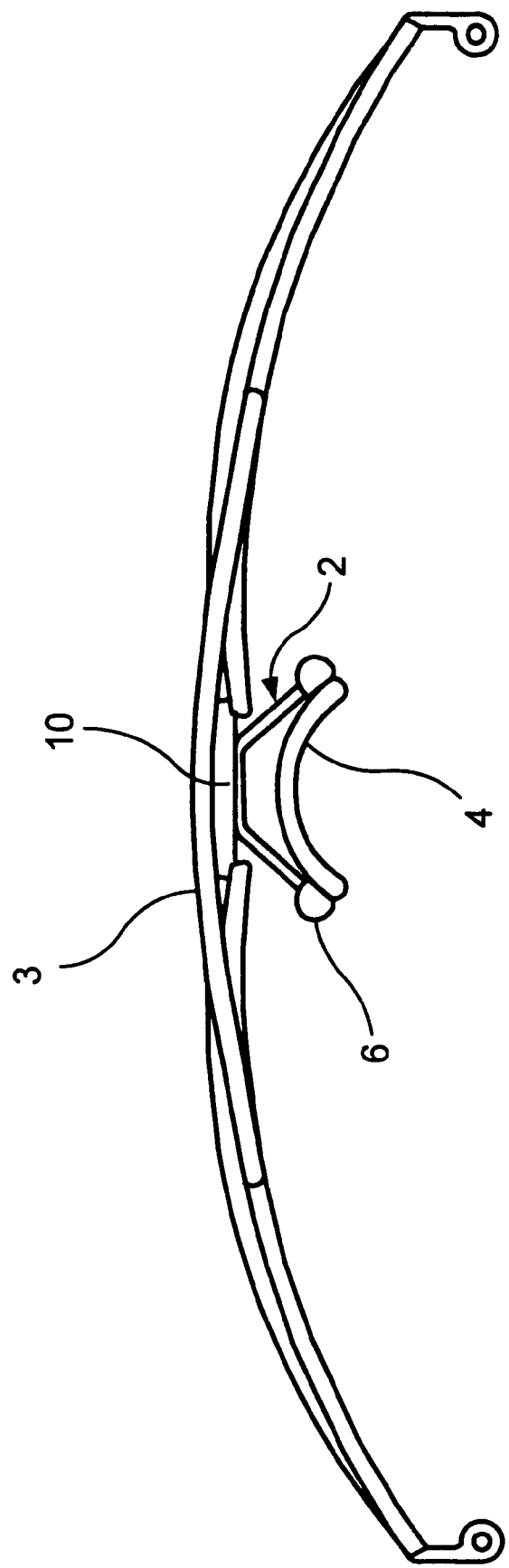
FIG. 3 is a top planar view of the preferred embodiment of the invention.

FIGS. 2 and 3 show the invention as situated on eyeglasses (3). A front lateral face (10) of the support bar (9) is fixedly attached to the bridge (5) as seen in FIG. 2. The length of the lateral face (10) is generally defined along the length of the bridge (5), preferably not exceeding the length of the bridge (5) for aesthetic reasons, but being of a length to provide sufficient anchor support for the assembly.

In a preferred embodiment, FIGS. 2 and 3 show the nose pad assembly comprising the nose pad support member and the nose pad, wherein the nose pad support member and the nose pad are preferably arranged with the arms extending at an angle θ, as shown in FIG. 6. The angle θ is such that when the eyeglasses are placed upon the head, the nose pad assembly retains sufficient rigidity to provide the necessary support. The angle θ is preferably no greater than about 40° along a horizontal line drawn between the pair of arms and the lateral face.

In a particular embodiment, provided in a non-limited manner strictly as an example, the dimension for the support bar (9) is about 23 mm in length, and when in the preferable bent configuration the lateral face (10) is about 8 mm in length. With reference to FIGS. 5 and 8, the nose pad (4) is about 23 mm in length, about 4.5 mm in horizontal width, and about 1.5 mm in thickness excluding the second fasteners (8). The second fasteners (8) is about 4 mm in height and about 2 mm in horizontal width as seen in FIG. 5. However, the skilled artisan may prepare a nose pad support assembly with varying dimensions, and of varying construction, so long as the principles of the invention are adhered to. Furthermore, while a unitary construction of the support member is preferable, it is also possible to provide separate bar and arms portions, connected to each other to provide the requisite rigidity and flexibility. The joinder of the arms to the bar may be by way of welding, or perhaps a biased hinge to provide a greater degree of control the flexing of the arms relative to the bar.

What is claimed is:

1. A nose pad assembly for eyeglasses which includes a bridge portion, the assembly comprising,
   a support member comprising an elongate bar fixable to a rear face of the bridge portion, the bar having arms extending from either end thereof, away from the bar in a rearward direction, the bar and arms being of relatively rigid construction, while the arms are able to flex rotationally about a junction point with the bar in response to pressure applied to the arms, while providing a biasing force against said pressure, and
   a nose pad made of flexible material, the nose pad being attached at either lateral edge thereof to a free end of a respective arm of the support member.

2. The assembly of claim 1, wherein the bar and arms are made of metal.

3. The assembly of claim 1, wherein the bar and arms of unitary construction.

4. The assembly of claim 1, wherein the arms comprise at the free ends thereof an enlarged surface for connecting to the nose pad.

5. The assembly of claim 1, wherein the arms extend at an angle between about 0 and 40 degrees relative to a perpendicular line extending rearward from the bar.

6. The assembly of claim 1, wherein the nose pad is made of PVC.

7. An eyeglass frame comprising a bridge portion and nose pad assembly, the assembly comprising,
   a support member comprising an elongate bar fixed to a rear surface of the bridge portion, the bar having arms extending from either end thereof, away from the bar in a rearward direction, the bar and arms being of relatively rigid construction, while the arms are able to flex rotationally about a junction point with the bar in response to pressure applied to the arms, while providing a biasing force against said pressure, and
   a nose pad made of flexible material, the nose pad being attached at either lateral edge thereof to a free end of a respective arm of the support member.

8. The eyeglass frame of claim 7, wherein the bridge portion acts as the bar portion to support the extending arms directly therefrom.

* * * * *